United States Patent
Hosaka

(10) Patent No.: US 6,533,927 B1
(45) Date of Patent: Mar. 18, 2003

(54) LIQUID FEEDER FOR ELECTRODISCHARGE MACHINING

(75) Inventor: Akio Hosaka, Sakai-gun (JP)

(73) Assignee: Sodick Co., Ltd., Kanagawa (JP)

( * ) Notice: Subject to any disclaimer, the term of this patent is extended or adjusted under 35 U.S.C. 154(b) by 20 days.

(21) Appl. No.: 09/889,412

(22) PCT Filed: Sep. 13, 2000

(86) PCT No.: PCT/JP00/06296

§ 371 (c)(1),
(2), (4) Date: Jul. 17, 2001

(87) PCT Pub. No.: WO01/36139

PCT Pub. Date: May 25, 2001

(30) Foreign Application Priority Data

Nov. 17, 1999 (JP) ............................................. 11-327515

(51) Int. Cl.⁷ ................................................. B23H 7/36
(52) U.S. Cl. ...................... 210/97; 210/167; 210/195.1; 219/69.14
(58) Field of Search .......................... 219/69.14; 210/97, 210/167, 168, 171, 172, 194, 195.1, 254, 257.1, 416.1, 416.5

(56) References Cited

U.S. PATENT DOCUMENTS 5,434,381 A * 7/1995 Mitcheson

FOREIGN PATENT DOCUMENTS

| JP | 63-197023 | 12/1988 |
|---|---|---|
| JP | 4-171123 | 6/1992 |
| JP | 5-4117 | 1/1993 |
| JP | 5-42424 | 2/1993 |
| JP | 5-37422 | 5/1993 |
| JP | 7-246520 | 9/1995 |
| JP | 8-215940 | 8/1996 |
| JP | 2557992 | 9/1997 |

OTHER PUBLICATIONS

International Search Report prepared by JPO.

* cited by examiner

*Primary Examiner*—Joseph W. Drodge
*Assistant Examiner*—Terry K. Cecil
(74) *Attorney, Agent, or Firm*—McDermott, Will & Emery; Paul Devinsky

(57) ABSTRACT

A dielectric fluid system (2) for an electric discharge machining apparatus includes an auxiliary tank (22) positioned at or higher than a work tank (12) and a dielectric fluid reservoir (21), a filter device (23), and a first pump (P1) and a second pump (P2) upstream and downstream of the filter device 23. Dielectric fluid in the dielectric fluid reservoir (21) is filtered by the filter device (23), and pumped to the auxiliary tank (22) using the first and second pumps (P1) and (P2). The filtered dielectric fluid is then rapid fed from the auxiliary tank (22) to the work tank (12). During electric discharge machining, dielectric fluid is pumped from the work tank (12), filtered, then cooled and circulated directly back to the work tank (12). A flushing pipe line and a third pump (P3) may be added into the circulating pipe line. Also, a relief pipe line (K) containing a relief valve (RV) may be provided in parallel with the filter device (23), and a regulating pipe line (H), connected in parallel with the first pump (P1) and the filter device (23), may be provided as an effective safety measure.

6 Claims, 8 Drawing Sheets

LIQUID FEEDER FOR ELECTRODISCHARGE MACHINING

TECHNICAL FIELD

The present invention relates to a dielectric fluid system of an electric discharge machining apparatus for collecting dielectric fluid from a work tank of the electric discharge machining apparatus cleaning the fluid and re-supplying the fluid to the work tank.

DESCRIPTION OF THE RELATED ART

Electric discharge machining is a process for machining a workpiece into a desired shape by periodically applying an appropriate electric discharge machining voltage between the workpiece and a tool electrode (hereafter referred to simply as an electrode) arranged opposite to each other across a specified electric discharge machining gap (hereafter referred to simply as the machining gap) to continuously generate electric discharges, and moving the workpiece and the tool electrode relative to each other. In order to be better able to carry out this electric discharge machining process, electric discharge machining fluid (hereafter referred to simply as dielectric fluid) is supplied to the machining gap.

The dielectric fluid plays several important roles as a machining medium for electric discharge machining. A first role is to remove chips and debris generated as a result of electric discharges from the machining gap, as well as tar-like products which may become entrained in some dielectric fluids as a result of the heat due to the electric discharges. A second role is to cool the machining gap so as to create favorable conditions for the electric discharge machining process, and to suppress the tendency for deformation of the workpiece due to thermal expansion. A third role is to maintain isolation of the machining gap in order to maintain favorable electric discharge machining conditions. As will be described below, when an aqueous dielectric fluid is used, the specific resistance of water is usually adjusted.

Therefore, the dielectric fluid used for electric discharge machining in the work tank is filtered, cooled and subjected to specific resistance adjustment as required, and then re-supplied to the work tank after being collected in a dielectric fluid reservoir. Where an electric discharge machine uses a flushing device such as a flushing nozzle, dielectric fluid is similarly supplied to a machining gap after being filtered. A typical electric discharge machining apparatus is therefore provided with a dielectric fluid system for supplying and controlling dielectric fluid.

A typical dielectric fluid system includes a dielectric fluid reservoir having a dirty dielectric fluid tank and a clean dielectric fluid tank. Dirty dielectric fluid that has been discharged from the work tank is temporarily collected in the dirty dielectric fluid tank, and chips and debris having a comparatively heavy specific gravity precipitate here. The dielectric fluid in the dirty fluid tank is pumped through a filter apparatus by a pump, and chips and debris in the fluid are removed from the fluid which is then stored in the clean dielectric fluid tank. Decontaminated dielectric fluid in the clean fluid tank is re-supplied to the work tank by a pump, and supplied to the machining gap for flushing, as required.

This type of dielectric fluid system may also include a dielectric fluid cooling apparatus, for keeping the dielectric fluid in the work tank at a specified temperature. Also, a dielectric fluid system of an electric discharge machining apparatus which uses water based dielectric fluid may be provided with, for example, a specific resistance control apparatus including a deionizer using mixed-bed resin, which regulates the specific resistance of the dielectric fluid so as to maintain it at a value within a specified range.

The above-described conventional dielectric fluid system has several short commings which the present invention is intended to overcome.

A first object of the present invention is to reduce the time for supplying dielectric fluid to an empty work tank (hereafter referred to as rapid feed), and more specifically to shorten the rapid feed time. Conventionally, when submerging a workpiece in dielectric fluid to perform electric discharge machining, the amount of dielectric fluid to be supplied to the work tank is comparatively large, and the waiting time until the work tank is filled is too long. Accordingly, an apparatus has been proposed to supply dielectric fluid to the clean dielectric fluid tank having a large capacity matching the work tank, arranged at a position higher up than the work tank, thus supplying the dielectric fluid to the empty work tank in a reduced amount of time. This is disclosed, for example, in Japanese laid open Patent No. Hei. 5-004117 and Japanese laid open Patent No. Hei. 5-042424.

A second object of the present invention is to reduce the installation space occupied by an electric discharge machining apparatus. Conventionally, in those electric discharge machining apparatus in which the workpiece is submerged in a dielectric fluid for machining, in order to replace the workpiece after machining it is necessary to temporarily store the dielectric fluid which is in the work tank in a dirty dielectric fluid tank having a capacity matching the volume of the work tank. Also, in order to supply cleaned dielectric fluid to the empty work tank in a reduced time, it is also necessary to store, in the clean dielectric fluid tank, a volume of clean dielectric fluid which matches the volume of the work tank. As a result, the capacity of the dielectric fluid reservoirs for both the dirty dielectric fluid tank and the clean dielectric fluid tank is from 2.5 to 3.0 times the capacity of the work tank. This gives rise to a problem in that the installation space required by the dielectric fluid system is quite large compared to the overall installation space of the electric discharge machining apparatus. As a countermeasure in order to reduce the installation space of the storage tank, the height of the storage tank is increased or the dirty dielectric fluid tank and the clean dielectric fluid tank are arranged so as to have a two-stage overlapping structure. This is disclosed, for example, in Japanese laid open Patent No. Hei. 4-171123.

A third object of the present invention is to efficiently perform collection and filtration of some of the dielectric fluid in the work tank, and return it to the work tank during electric discharge machining (hereafter referred to as circulation). Conventionally, when the dielectric fluid reservoir is provided with a dirty dielectric fluid tank and a clean dielectric fluid tank, some of the dielectric fluid in the work tank is collected in the dirty dielectric fluid tank, is filtered by being passed through a filter, and is temporarily stored in the clean dielectric fluid tank. Then, dielectric fluid in the clean dielectric fluid tank is circulated by being re-supplied to the work tank. In this case, as preparation for feeding clean dielectric fluid to the empty work tank at the time of commencing the subsequent electric discharge machining operation, it is necessary to store a large volume of dielectric fluid, significantly more than the amount of dielectric fluid required for circulation, in the clean dielectric fluid tank during the preceding electric discharge machining operation. For this reason, a pump having a large discharge capacity and a filtration device for filtering a large volume are required, thus increasing costs. Also, particularly when water based dielectric fluid is used, the dielectric fluid comes into contact with more air while being stored in the large fluid tank, and there is a problem that the specific resistance value is reduced due to carbon dioxide penetration, etc. As a countermeasure, it has been considered to directly collect dielectric fluid overflowing while performing electric discharge machining using a pump, filtering using a filter, and to return the fluid directly to the work tank. This is disclosed, for example, in publications such as Japanese laid open Patent No. Hei. 5-037422, Japanese laid open Patent No. 8-215940 and Japanese Utility Model No. 2557992.

As described above, there are various problems in existing dielectric fluid systems which require improvement and solutions to some of these problems have been considered. However, none of the solutions proposed to date are adequate for solving all of the above-mentioned problems. It is desirable to provide a dielectric fluid system which minimizes the installation space occupied by a dielectric fluid tank, efficiently filters and circulates dielectric fluid to supply clean dielectric fluid quickly to the work tank, and wherein, even if there is trouble with the pump of the supply device or clogging of the filter no major damage to the dielectric fluid supply system will result.

DISCLOSURE OF THE INVENTION

It is therefore an object of the present invention to provide an improved dielectric fluid system for an electric discharge machine that has a relatively small installation space, and also reduces the time for feeding dielectric fluid to an empty work tank and that efficiently filters dielectric fluid circulating during electric discharge machining.

It is also an object of the present invention to provide a dielectric fluid system for an electric discharge apparatus which implements safety measures to avoid major failures.

These and other objects and advantages of the present invention are achieved by the dielectric fluid system described below.

According to the present invention, a dielectric fluid system for an electric discharge machining apparatus, for supplying dielectric fluid to a work tank with a workpiece submerged in the dielectric fluid may comprise a dielectric fluid reservoir for storing dielectric fluid collected from the work tank, an auxiliary tank positioned higher than the work tank and positioned at or above the height of the dielectric fluid reservoir, a filter device arranged between the dielectric fluid reservoir and the auxiliary tank, a main supply pipe line connecting the dielectric fluid reservoir to the auxiliary tank, and, provided in series with a first pump, a filter device and a second pump, a circulating pipe line connected to the main supply pipe line at an intake side of the first pump and branching from the main supply pipe line at an outlet side of the second pump and connecting to the work tank, a rapid feed pipe line having a first drain valve for connecting from the auxiliary tank to the work tank, a drain pipe line having a second drain valve for connecting the work tank to the dielectric fluid reservoir, first and second control valves positioned at an intake side of the first pump for selectively connecting the main supply pipe line and the circulating pipe line, and third and fourth control valves positioned at an outlet side of the second pump for selectively connecting the main supply pipe line and the circulating pipe line.

With this structure, clean dielectric fluid may be temporarily stored in the compact filter device and the auxiliary tank arranged at or above the height of the dirty dielectric fluid tank. This which means that there is no need for a large, clean dielectric fluid tank as in the related art. During advance preparation etc., dielectric fluid may be pumped to the auxiliary tank which is arranged at a position at or above the top of the work tank, and when the dielectric fluid is fed to the work tank, the dielectric fluid falls quickly from the auxiliary tank to the work tank and at the same time deficient dielectric fluid, to the extent there is any in the auxiliary tank, is pumped from the dielectric fluid reservoir to the auxiliary tank. This means that the time needed to feed dielectric fluid to the work tank is effectively only the time needed to pump the deficient dielectric fluid to the auxiliary tank, thus further reducing the feed time.

A dielectric fluid system of an electric discharge machining apparatus of the present invention may further be provided with a flushing pipe line branching from the circulating pipe line at an outlet side of the second pump and connecting to a flushing device of the electric discharge machining apparatus, and provided with a third pump and a fifth control valve group inside the flushing pipe line for selectively opening and closing the flushing pipe line.

With this structure, a flushing operation in which dielectric fluid is collected from the work tank, filtered, and jetted into the machining gap may be efficiently carried out by directly circulating a minimum amount of dielectric fluid.

A dielectric fluid system of an electric discharge machining apparatus of the present invention may further be provided with a by-pass pipe line, branching from the main supply pipe line at an intake side of the first pump, for connecting the flushing pipe line which includes the third pump, at an intake side of the third pump, branching from the flushing pipe line at an outlet side of the third pump and connecting to the auxiliary tank, and a sixth control valve for selectively opening and closing the by-pass pipe line.

With this structure, when the dielectric fluid system pumps dielectric fluid to the auxiliary tank, it is possible to use the third pump of the flushing pipe line in addition to the main supply pipe line pump, which means that the rapid feed of dielectric fluid to the work tank can be made still shorter.

Either of the dielectric fluid systems for an electric discharge machining apparatus according to the present invention may be further provided with a relief pipe line, including a relief valve, connecting an upstream side and a downstream side of the filter device and arranged in parallel with the filter device, and a regulating pipe line connecting a branch point at an intake side of the first pump to a confluence point at an intake side of the second pump, the confluence point being downstream of the filter device, and arranged in parallel with the first pump and the filter device.

In this way, because the relief pipe line of the dielectric fluid system is in parallel with the filter device and the regulating pipe line is in parallel with the first pump and the filter device, the first and second pumps do not require an extremely large discharge capacity. In addition, even if the filter device becomes clogged, the filter will not rupture, and even if there is a failure of one of the pumps, there will be no overall pump failure.

BRIEF DESCRIPTION OF THE DRAWINGS

The present invention will now be described with reference to the particular embodiments shown in the drawings.

DETAILED DESCRIPTION OF THE PREFERRED EMBODIMENTS

Figure 1:
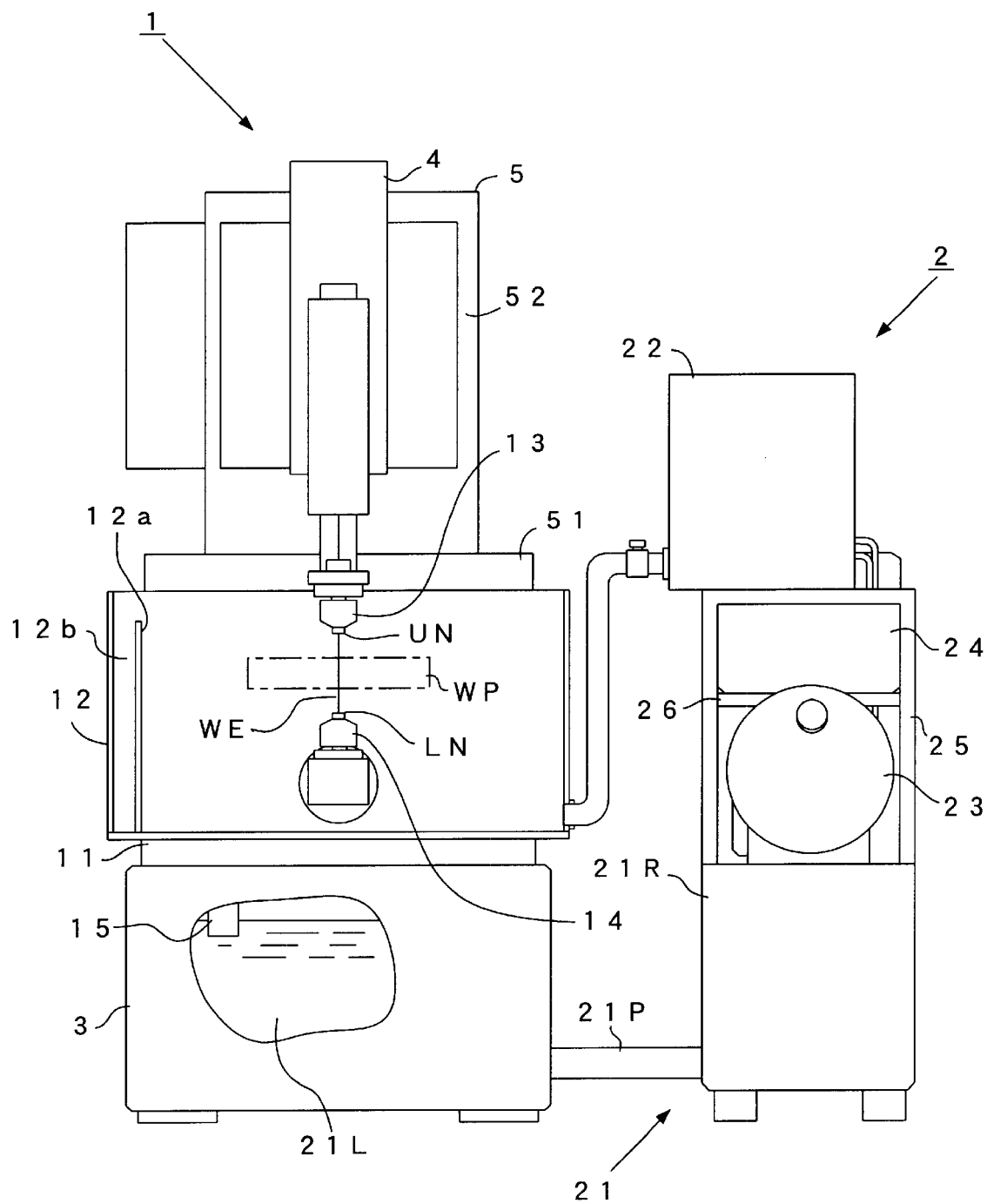
FIG. 1 is a front elevation showing an overview of an electric discharge machining apparatus according to the present invention.
Figure 2:
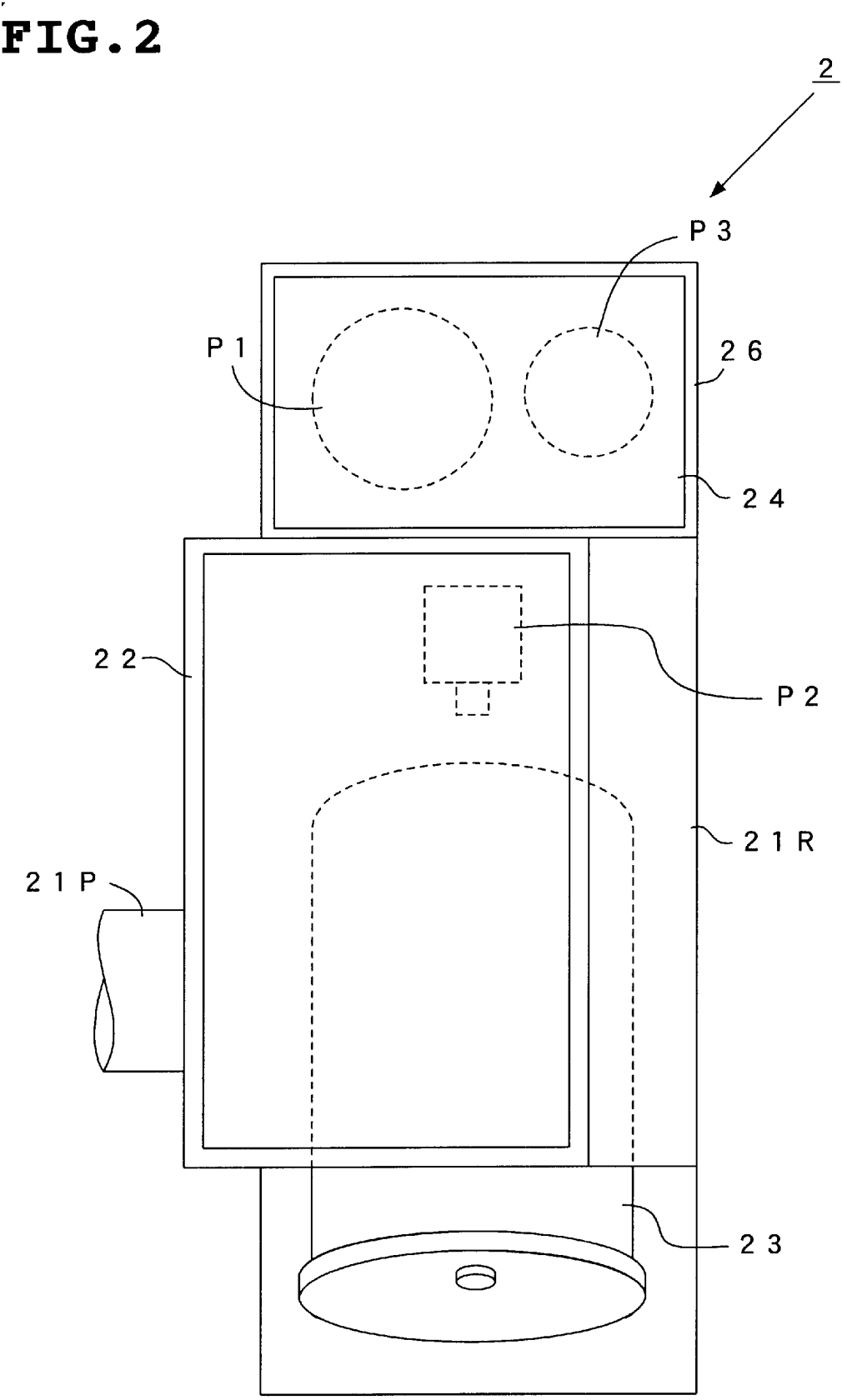
FIG. 2 is a plan view showing an overview of a dielectric fluid system of an electric discharge machining apparatus according to the present invention, seen from above.
Figure 3:
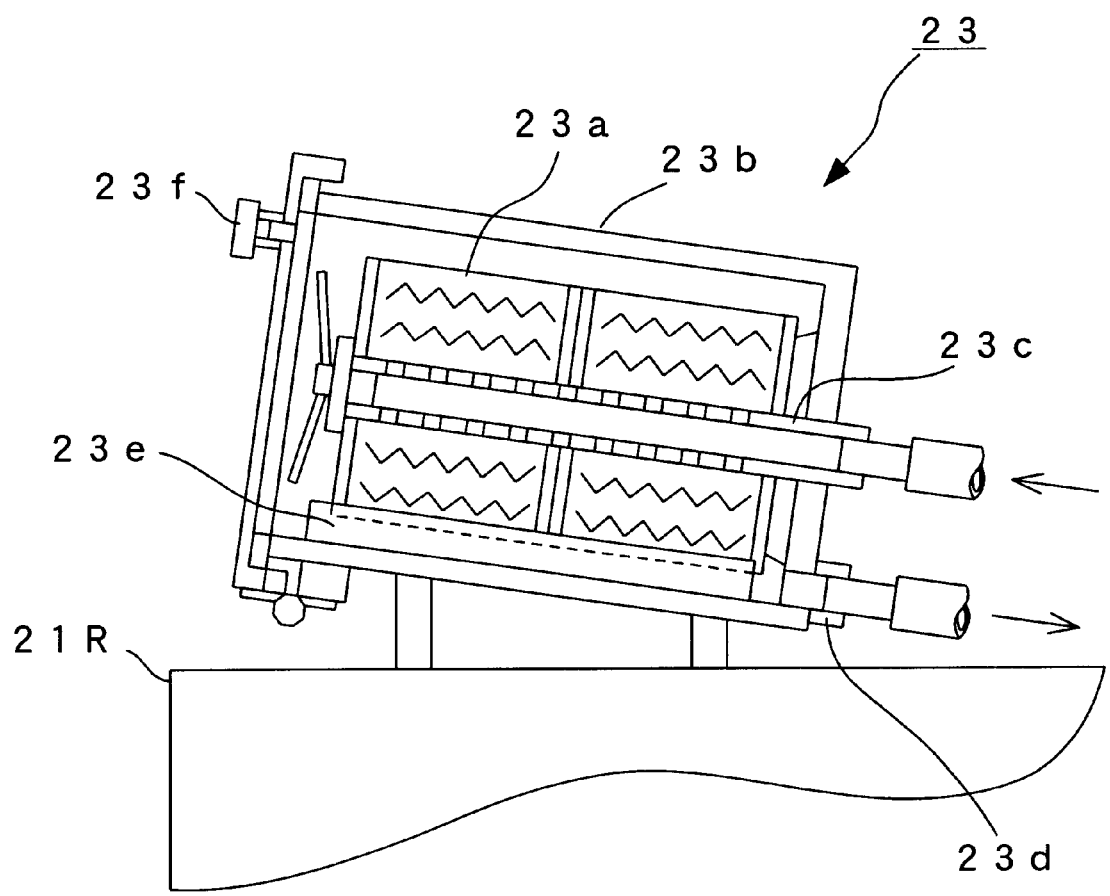
FIG. 3 is a cross section showing an overview of a filter device which may be used in the dielectric fluid system of FIG. 2, viewed from the side.

A preferred embodiment of an electric discharge machining apparatus of having a machining fluid according to the present invention is shown in FIG. 1, FIG. 2 and FIG. 3. Which the electric discharge machining apparatus depicted is a wire cut electric discharge machine using a water based dielectric fluid, the same principles apply when the electric discharge machining apparatus is a die sinking electric discharge machining apparatus provided with a similar fluid tank and flushing device.

The electric discharge machining apparatus comprises the electric discharge machining apparatus itself 1, a dielectric fluid system 2, a power supply device and a numerical control device for electric discharge machining, although the latter devices are not shown in the drawing. A table 11 is provided on a bed 3, and a work tank 12 formed of four wall members is arranged on the table 11.

The work tank 12 shown in FIG. 1 is shown in a state where a front door is removed. In use workpiece WP (shown in dashed lines) is fitted to a work stand, not shown, which is positioned in the work tank 12. Also, a small overflow chamber 12b for collecting dielectric fluid that spills over from the work tank 12, is formed by a partition baffle 12a. By adjusting the baffle 12a up and down, it is possible to adjust the upper limit of the level of the dielectric fluid in the work tank 12.

Disposed above the workpiece WP, there is an upper guide assembly 13, including an upper nozzle UN for jetting dielectric fluid towards the machining gap during flushing operations, and an upper wire guide, not shown, for guiding a traveling wire electrode WE fed out from above. The upper assembly is attached to a work head 4 via an upper arm. Also, disposed below the workpiece WP there is a lower guide assembly 14, including a lower nozzle LN for jetting dielectric fluid to the machining gap during a flushing operations, and an lower wire guide, not shown, for guiding the traveling wire electrode WE fed out from above. The lower guide assembly 14 is attached to a lower arm, provided on a column 5 and passes through the wall of the work tank 12.

The column 5 is moveably provided on the bed 3 to the rear of the work tank 12, and comprises a lower unit 51 that can move in the X axis direction, and an upper unit 52 that can move in the Y axis direction orthogonal to the X axis direction. The work head 4 is attached to this column 5.

Figure 4:
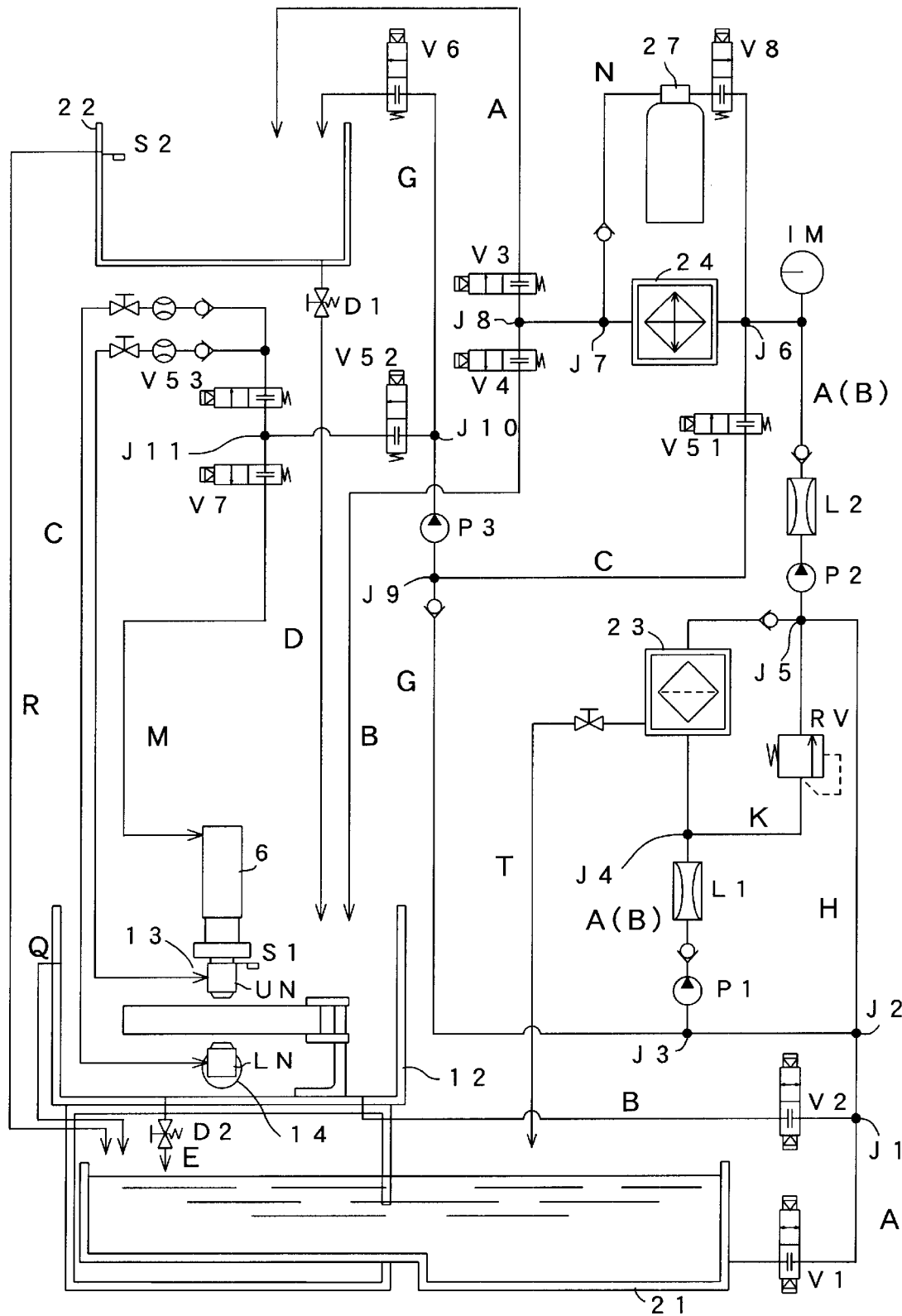
FIG. 4 is a piping layout drawing of a dielectric fluid system of an electric discharge machining apparatus according to the present invention.

The dielectric fluid system 2 is typically positioned adjacent the electric discharge machining apparatus 1. This dielectric fluid system 2 comprises a dielectric fluid reservoir 21R, an auxiliary tank 22 mounted on this dielectric fluid reservoir, a filter device 23 and a cooling device 24 (hereafter referred to as a cooler). Also, as shown in FIG. 2, a first pump P1, a second pump P2 and a third pump P3, if required, are provided in this dielectric fluid system 2. The piping, as well as the various control valves and sensors etc. appropriately arranged along the piping are arranged, (not depicted in FIGS. 1–3) are shown in FIG. 4 and will be described below.

In the illustrated embodiment, the dielectric fluid reservoir 21 comprises only a dirty dielectric fluid tank. The dielectric fluid reservoir 21 comprises a first tank 21L, being an auxiliary tank provided in a space in the bed 3, a second tank 21R being a main tank provided in a lower section of the main body of the dielectric fluid system, and a linking tube 21P. These two sections of the dielectric fluid reservoir 21L and 21R are functionally the same fluid tank, but by dividing the dielectric fluid reservoir into two tanks the installation space of the fluid tank 21R may be reduced to the extent of the installation area of the bed 3 side. The fluid tank 21L is positioned directly underneath the work tank 12, which means that by simply providing a drain opening in the bottom of the work tank 12 it is possible to have an arrangement such that the comparatively large diameter drain tube 15 does not project outside of the electric discharge machining apparatus main body 1. Naturally it is also within the scope of the invention that the dielectric fluid reservoir not be divided and comprise only the second tank 21R. In other words, the present invention is not limited to dividing the dielectric fluid reservoir 21.

The capacity of the dielectric fluid reservoir 21 is best determined with reference to the maximum capacity of the work tank 12. The maximum capacity of the dielectric fluid reservoir 21 is larger than that of the maximum capacity of the work tank 12, at least to the extent of the dielectric fluid overflowing from the work tank 12 and the circulating fluid. The capacity may typically be about 1.2 times the maximum capacity of the work tank 12. However, where the electric discharge machine is a wire cut electric discharge machine, as in the illustrated embodiment, the dielectric fluid reservoir 21 is preferably formed having a capacity of about 1.5 times that of the work tank 12. This is because water based dielectric fluid evaporates during repeated use of the device and the amount of dielectric fluid initially supplied is therefore reduced over time. Also, an extra volume is advantageous because an amount of dielectric fluid equivalent to that retained in the bottom of the dielectric fluid reservoir is not discharged.

The auxiliary tank 22 is preferably provided on a platform of a frame 25 arranged directly above the dielectric fluid reservoir 21, so that the bottom surface of the auxiliary tank 22 is positioned at least as high as the upper surface of the work tank 12. It is acceptable for the capacity of the auxiliary tank 22 to be about half the volume of the work tank 12, as will be described later. In the illustrated arrangement, the auxiliary tank 22 is mounted with the dielectric fluid reservoir 21R, together with the pumps P1, P2 and P3, the filter device 23 and the cooler 24.

The filter device 23 is advantageously mounted on a cover of the second tank 21R of the dielectric fluid reservoir 21, in a space enclosed by the frame 25. The filter device 23 filters dirty dielectric fluid, turning it into clean dielectric fluid, and supplies it downstream.

In more detail, the filter device 23, as shown in FIG. 3, preferably comprises a filter 23a, and a filter tank 23b for storing the filter 23a. The filer 23a filters and cleans dirty dielectric fluid pumped from the dielectric fluid reservoir 21 and the work tank 12, and one or two filters are provided according to necessity. In this embodiment, an internal pressure type filter is adopted as the filter 23a. This prevents large force caused by pressure of dielectric fluid, which may reach a maximum of 2 kgf/cm$^2$ in the event of a filter blockage, from acting directly on the tank walls of the filter tank 23b. The filter tank 23b is a container for isolating filtered dielectric fluid from the outside in a fluid tight manner. As dielectric fluid from this container is quickly sucked in by the second pump 2, it is acceptable for the filter tank 23b to be only a small container.

A core tube 23c is implanted in the center of the filter tank 23b, and dielectric fluid supplied from the first pump P1 is pumped through the inside of the core tube 23c, passes through minute holes in the core tube 23c, is pumped to the inside of the filter 23a, and is filtered by the filter 23a. The filter tank 23b is preferably tilted and an outlet pipe opening 23d is fitted at a lowermost part of the filter tank 23b so that it is easy for the filtered dielectric fluid to be collected and sucked out. Also, a rail 23e is preferably attached to the inside of the filter tank 23b, with the filter 23a being mounted on this rail, so as to make changing of the filter 23a inside the filter tank easier. Reference numeral 23f denotes an air purge. When dielectric fluid is initially supplied after changing the filter 23a, the air purge 23f is opened so that air inside the filter tank 23b can escape. However, if the volume of the filter tank 23b is small, it is possible to do away with the air purge. A drain hole, not shown in the drawings, may be provided underneath the filter tank 23b. When the filter is changed this drain hole is opened and dielectric fluid inside the filter tank 23b is taken out.

A cooler 24 for cooling the dielectric fluid to a specified temperature, is well known in the art, and is preferably mounted on a platform 26 provided at the rear of the frame 25 as depicted in FIG. 2.

FIG. 4 illustrates the piping arrangement for the dielectric fluid system depicted in FIG. 1 to FIG. 3. The state shown in this drawing, with dielectric fluid only retained in the dielectric fluid reservoir 21, is the state of affairs immediately after initial supply of dielectric fluid to the dielectric fluid reservoir 21, or when the electric discharge machining apparatus has no immediate machining plan and is stopped. A liquid level sensor S2 provided in the auxiliary tank 22 detects that an appropriate amount of dielectric fluid has been supplied to the auxiliary tank 22. Also, a liquid level sensor SI attached to an upper guide assembly 13 detects the height of the liquid level of dielectric fluid when dielectric fluid is supplied during machining to set the height of the liquid level. Even if the upper nozzle UN moves vertically during machining, the height of the liquid level of the dielectric fluid may be set in accordance with this movement. Of course, it is also possible to use the baffle 12a described in FIG. 1 to set the fluid level height. The pumps and control valves in the drawings are controlled by a control device, but this control device has been omitted from the drawings.

First, an outline of the six main piping paths will be described. For convenience, these paths are given functional names for ease of understanding. As some of the piping paths may perform duplicate functions they will be given duplicate names.

Pipe line A is the main supply pipe line, connecting from the dielectric fluid reservoir 21 to the auxiliary tank 22, and includes the first pump P1, the filter device 23, the second pump P2, and the cooler 24. Using this pipe line A, dielectric fluid is pumped from the dielectric fluid reservoir 21 to the auxiliary tank 22.

Pipe line B is a circulating pipe line, having the work tank 12 as a start point. Pipe line B is connected to the main supply pipe line A at a confluence point J1 upstream of the first pump P1 of the main supply pipe line A. It then branches from a branch point J8 downstream of an outlet of the cooler 24 to return to the work tank 12. Large parts of the piping of pipe line B are common with the main supply pipe line A, sharing the pump P1, the pump P2 the filter device 23, the cooler 24, etc. Using pipe line B, dielectric fluid may be pumped from the work tank 12, filtered, then cooled and circulated back to the work tank 12.

Pipe line D is a rapid feed pipe line formed from a comparatively large diameter pipe, connecting a drain opening of the auxiliary tank 22 to the work tank 12, and is used when dielectric fluid is fed rapidly to the work tank 12.

Pipe line E is a drain pipe line for draining dielectric fluid of the work tank to the dielectric fluid reservoir 21.

Pipe line C is a pipe line for use where the event of the electric discharge machine is equipped with a flushing device, and in this embodiment it is a flushing pipe line, including the third pump P3, branching from a branch point J6 between the pump P2 and the cooler 24 of the main supply pipe line A and connected to the upper nozzle UN and the lower nozzle LN, being flushing devices. Using this pipe line, dielectric fluid for high pressure flushing is supplied to the upper nozzle UN and the lower nozzle LN. The third pump P3 is a so-called high-pressure pump, capable of discharging dielectric fluid at a comparatively high pressure.

Pipe line G is a by-pass pipe line branching from a branch point J3 upstream of the suction of the first pump P1 of the main supply pipe line A, connecting to the flushing pipe line C at a confluence point J9 at the inlet side of the third pump P3, branching at the branch point J10 at the outlet side of the third pump P3, and finally reaches the auxiliary tank 22. This by-pass pipe line G is not required as a basic structural element of the present invention, but providing this pipe line will make it possible to obtain better results. If this pipe line G is provided, when dielectric fluid is pumped to the auxiliary tank 22 using the main supply pipe line A, dielectric fluid can also be pumped using pipe line G, from the branch point J3 of the main supply pipe line A, using the third pump P3 of the flushing pipe line C. The third pump P3 can be used to obtain a reasonable discharge amount of low pressure discharge which makes it useful for the above described pumping operation.

A description of the pump P1 and the pump P2 in the pipe line shared by the main supply pipe line A and the circulating pipe line B now follows.

The first pump P1 is a main pump for pumping dielectric fluid from the work tank 12 or the dielectric fluid reservoir 21 and passing it through the filter device 23 for filtering. Accordingly, this pump requires sufficient discharge capability to pump a desired amount of dielectric fluid from the dielectric fluid reservoir 21 or the work tank 12, and convey it to the filter tank against the filter resistance of the filter 23a, but does not need to be able to force dielectric fluid up to the auxiliary tank 22. The pump P1 therefore can be made smaller than a pump designed to draw up dielectric fluid to the auxiliary tank after it has been filtered.

The second pump P2 is provided on an outlet side of the filter device 23, and is arranged in series with the first pump P1 to assist the first pump P1. This second pump requires the discharge capability to pump dielectric fluid filtered by the filter device 23, pass it through the cooler 24 and convey it to the auxiliary tank 22 or the work tank 12. Since the pump P2 only assists the first pump P1, its discharge capability may be slightly smaller than that of the first pump P1, i.e., a relatively small pump is sufficient. Also, since the pump P2 sucks dielectric fluid from the filter device 23, the filtering efficiency of the filter 23a is improved. This improvement in filtering efficiency makes fluid circulation more efficient by causing dirty dielectric fluid from the work tank 12 to pass directly through the filter device 23 before returning it directly to the work tank 12.

Control valves are provided in the above-described pipe lines, as is described below.

Constant flow valves L1 and L2 are respectively provided at the outlet side of the first and second pumps P1 and P2. These valves respectively regulate the flow amount of dielectric fluid discharged from the pumps P1 and P2, and prevent unreasonable loads or negative pressure from being imposed on the two pumps connected in series. Specifically, the flow amount of the constant flow amount valve L1 is preferably somewhat larger than that of the constant flow amount valve L2, so that the discharge amount of the pump P1 does not become unreasonably large, and so that negative pressure does not occur at the inlet side of the pump P2. It is possible to adopt a flow amount control valve instead of the constant flow amount valve. In this case, essentially the same type of flow control is carried out using the flow control valve. Check valves, (reference numerals omitted) are respectively arranged at least at either a suction inlet side or a discharge outlet side of the pumps P1 and P2. These check valves prevent reverse flow of dielectric fluid when the pumps are not operating.

In the main supply pipe line A and the circulating pipe line B, a first control valve V1 and a second control valve V2 are provided upstream of the confluence point J1, and a third control valve V3 and a fourth control valve V4 are provided downstream of the branch point J8. The pipe lines are opened and closed by these control valves, and the main supply pipe line A and the circulating pipe line B are changed over. Specifically, when dielectric fluid is pumped to the auxiliary tank 22, the control valves V1 and V3 in the main supply pipe line A are opened while the control valves V2 and V4 in the circulating pipe line B are closed, and the main supply pipe line A is used. Also, when dielectric fluid is circulated, the control valves V1 and V3 are closed while the control valves V2 and V4 are open and the circulating pipe line B is used.

In the flushing pipe line C a control valve V51 is provided downstream of the branch point J6, a control valve V52 is provided downstream of the branch point J10 (required in case the by-pass pipe line G is added), and a control valve V53 is provided downstream of the branch point J11, required where a wire threader jet pipe line M, issued, which is described below, is added, as a fifth control valve group, and when these control valves are opened the flushing pipe line C is used. Specifically, the control valve V2 of the circulating path B is opened so that dielectric fluid is sucked from the work tank 12 using the first pump P1, filtered by the filter device 23 and sent further downstream by the second pump P2. Then after filtration clean dielectric fluid is conveyed to the flushing pipe line C, pressurized by the third pump P3, and finally supplied to the nozzles UN and LN, and to the machining gap.

A first drain pipe line D1 is provided in the rapid feed pipe line D, which is opened when dielectric fluid in the auxiliary tank 22, positioned above the work tank 12, is supplied to the work tank in a short period of time.

A control valve, namely a second drain valve D2, is provided in the pipe line E, which is opened when dielectric fluid in the work tank 12 is rapidly discharged to the dielectric fluid reservoir 21.

A control valve V6, being a sixth control valve, is provided downstream of the branch point J10 of the by-pass pipe line G. The pipe line G is used with the control valve V52, one of the fifth control valve group of the flushing pipe line C, closed and with the control valve V6 opened.

Next, the piping paths relating to the safety measures of FIG. 4 will be described. The pipe line H is a regulating pipe line, branching from the branch point J2 at the inlet side of the first pump P1 to connect to the confluence point J5 between the filter device 23 and the second pump P2, and makes the effective pipe line passing through the first pump P1 and the filter device 23 shorter. In other words, from a point between the pump P1 and the pump P2, which are arranged in series, the regulating pipe line H functions to return surplus dielectric fluid discharged from the pump P1, i.e., which is in excess of the amount for the pump P2, to the inlet side of the pump P1. The regulating pipe line H also supplies or re-circulates deficient or surplus dielectric fluid when it becomes impossible to take out a consistent discharge amount from the pump P1 to feed the pump P2.

For example, should the first pump P1 fail and it becomes impossible to send sufficient fluid to the second pump P2, or should the filter 23a become clogged up, the regulating pipe line H supplies sufficient dielectric fluid directly to the second pump P2. Conversely, should when the second pump P2 fail and there is an excess of supply from the pump P1, the regulating pipe line B re-circulates excess dielectric fluid to the inlet side of the first pump P1. This avoids the occurrence of serious, irreversible damage, such as cavitation due to negative pressure of the second pump P2, seizure due to no load, or overheating due to excess load of the first pump P1. Obviously the occurrence of these drawbacks can be controlled by conventional means (omitted from the drawings), such as sensing using pressure switches in the pipe lines, or using thermal relays etc. to detect current overload of the pump motor and stop the motor, so that the pump may be stopped quickly. However, if the regulating pipe line H is provided, issues relating to too much or too little fluid at the inlet to pump P2, continuing up until the pumps is/are stopped due to the above described control, will not cause serious damage.

In this way, since the regulating pipe line H regulates the balance of fluid between of the two pumps, P1 and P2 arranged in series with the filter device 23, it has the effect of preventing overwork resulting from feeding fluid to the main supply pipe line A or to the circulating pipe line B, even if the filter device 23 positioned between the two pumps is a small vessel or a sealed vessel. This is because it is not required that the filter device 23 adjust or buffer any imbalance in the fluid feed amounts between these pumps.

The pipe line K is a relief pipe line branching from the branch point J4 between the first pump P1 and the filter device 23 to connect to the confluence point J5 between the filter device 23 and the second pump P2. Pipe line K contains a relief valve RV. Should the filter 23a become clogged and the pressure of the dielectric fluid raise to a specified high pressure, in the illustrated embodiment about 2 kgf/cm$^2$, the relief valve RV opens to link in the pipe line K. If a link is established through pipe line K, dielectric fluid discharged from the first pump P1 passes through the relief valve RV and is fed directly to the inlet side of the second pump P2. At this time, dielectric fluid that is fed from the first pump P1 and not sucked into the second pump P2 passes through the regulating pipe line H and is returned to the inlet side of the first pump P1, as explained above.

In this way, the relief pipe line K, acting in cooperation with the regulating pipe line H, substantially isolates the filter device 23 from the main supply pipe line A should the filter 23a become clogged, thus preventing explosive damage to the filter device 23, cavitation of the pump P2, or overheating of the pump P1 and the pump P2. The pipe line K has the important role of ensuring safety of the filter device 23 and pumps P1 and P2 when dielectric fluid is pumped to the auxiliary tank 22 or when dielectric fluid is caused to circulate to the work tank 12. In FIG. 4, the pipe line K merges at J5, the confluence point of the main pipe line A and the pipe line H, but it is possible to have it merge at a position that is either upstream or downstream, but close to the confluence point J5, as long as there is a connection between the filter device 23 and the second pump P2.

In FIG. 4, a number of pipe lines other than those described above are also provided. Pipe line Q is an overflow pipe line for collecting dielectric fluid that overflows the liquid level set at a required height by the baffle 12a of the work tank 12 and directing the overflow to the dielectric fluid reservoir 21. Also, pipe line R is an overflow pipe line for collecting dielectric fluid, that has reached a high fluid level in the auxiliary tank 22 and has overflowed, and directing the overflow to the dielectric fluid reservoir 21. The pipe line T is a drainage pipe line for draining dielectric fluid that has collected in the filter tank, when the filter 23a is replaced.

With the wire cut electric discharge machine of this embodiment that uses water based dielectric fluid, specific resistance management pipe lines are also required, in addition to the above described pipe lines. Pipe line N is a specific resistance management pipe line branching off at the point J6 between the second pump P2 and the cooler 24 and connecting to the confluence point J7 at the outlet side of the cooler 24. Pipe line N is provided with a deionizer 27, having an ion exchange resin, and a control valve V8. A resistivity sensor is provided, preferably in the main supply pipe line A. The resistivity sensor operates a resistivity meter IM, which provides an indication of the specific resistance value of dielectric fluid passing through the main supply pipe line A, When this value is output to a control device, (not shown), the control device compares the detected value with a previously set specific resistance value. When the detected value is lower than the specified set value, the control device opens the control valve V8 to pass dielectric fluid through the deionizer, to adjust the specific resistance of the dielectric fluid, i.e., to make it higher.

A wire threader jet pipe line M for supplying dielectric fluid to an automatic wire threader 6 is also provided in this embodiment. This pipe line M branches off at a branch point J11 immediately upstream of a control valve 53 of the jet pipe line C, and is connected to an automatic wire threader 6. This pipe line is provided with a control valve V7. When the automatic wire threader 6 inserts a wire electrode WE from an upper guide assembly 13 into a lower guide assembly 14, the control valve 53 is closed and the control valve V7 is opened to supply dielectric fluid to the automatic wire threader 6, and a jet stream for guiding the tip of the wire electrode in the insertion direction is produced. At this time, the pressure of the dielectric fluid is increased by means of the pump P3, as was the case for flushing described above.

Besides the components described above, manual valves not shown in FIG. 4 etc., which are only used in emergencies or for purposes of maintenance or inspection, and their operation, are omitted. Also, the above described control valves for automatically opening and closing the pipe lines may be electromagnetic valves, air pilot valves, etc.

Next, the dielectric fluid supply process for the dielectric fluid system of the electric discharge machining apparatus of the present invention will be described using FIG. 5 to FIG. 8. In these drawings, pipe lines shown by a bold solid line are pipe lines mainly used, pipe lines shown by a bold dotted line are pipe lines for auxiliary use, pipe lines shown by a thin solid line are pipe lines that are used as required or used for maintaining safety, and pipe lines shown by a dotted line are pipe lines that are not used. The control device causing operation of the control valves and the pumps, and the control wiring between the valves and pumps and the control device, have been omitted from the drawings.

Figure 5:
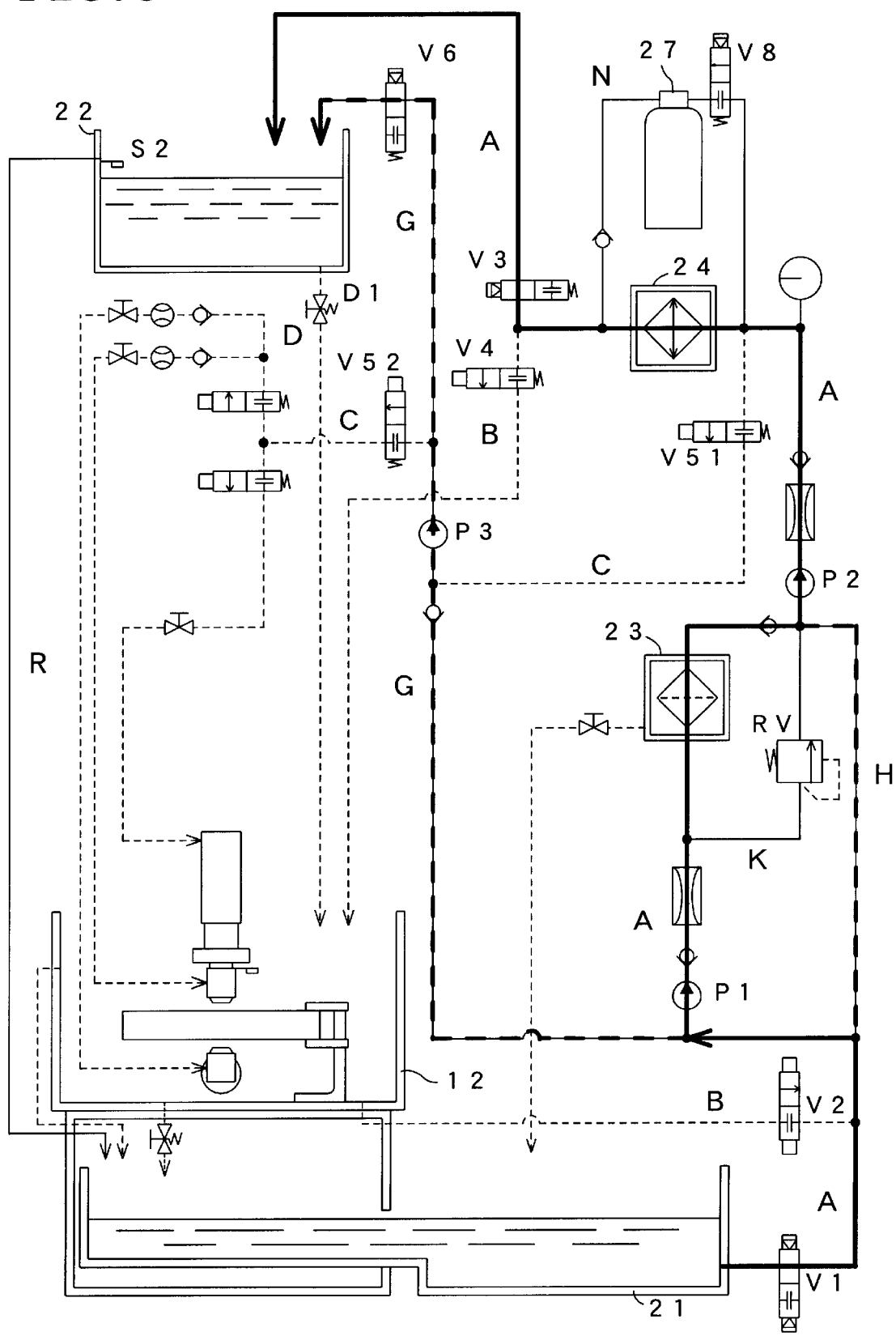
FIG. 5 is a piping layout drawing showing the state when the dielectric fluid system is pumping dielectric fluid from a dielectric fluid reservoir to an auxiliary tank.

Before high speed supply of dielectric fluid to the empty work tank 12, that is, before rapid feed, a rapid feed preparation operation to pump dielectric fluid to the auxiliary tank 22 is carried out. FIG. 5 shows the state where this pumping operation is almost complete. When the control device outputs a rapid feed preparation command signal, then, as shown in FIG. 5, the control valves V1 and V3 of the main supply pipe line A are opened and the first pump P1 and the second pump P2 are driven to pump dielectric fluid from the dielectric fluid reservoir 21, and the fluid is filtered by the filter device 23, cooled by the cooler 24 and pumped to the auxiliary tank 22. At this time, control valves V51 and V52 used to may be select the flushing pipe line C, control valves V2 and V4 may be used to select the circulating pipe line B, and the drain valve D1 of the rapid feed pipe line D is obviously closed. Also, as long as blockage does not occur in the filter 23a, the relief valve RV is closed and the relief pipe line K is closed. Dielectric fluid from the pump P1 side in excess of an amount pumped by the pump P2 circulates in the regulating pipe line H. As required, the control valve V8 is opened to pass dielectric fluid through the deionizer 27, i.e., to maintain the specific resistance of the dielectric fluid at a specified set value.

This rapid feed preparation operation has no relation to operations in the vicinity of the work tank 12, and so it is possible to perform this operations during setting up operations, etc. In this case, the operator is virtually does not experience any wasted waiting time due to this rapid feed preparation operation.

In FIG. 5, in the event that the by-pass pipe line G is also provided, in addition to the pumping using the main supply pipe line A described above, dielectric fluid may also be pumped using the by-pass pipe line G. Specifically, the control valve V6 may be opened and the third pump P3 turned on to pump dielectric fluid to the auxiliary tank 22 through the by-pass pipe line G. By so doing, the amount of time required for pumping can be reduced in accordance with the amount of dielectric fluid pumped by the third pump P3.

When the fluid level sensor S2 detects the fluid level of the dielectric fluid in the auxiliary tank 22, the pumps P1 and P2 are stopped and the system then stands-by in this state. At this time, dielectric fluid overflowing from the auxiliary tank 22 is returned to the dielectric fluid reservoir 21 from via the overflow pipe line R.

Figure 6:
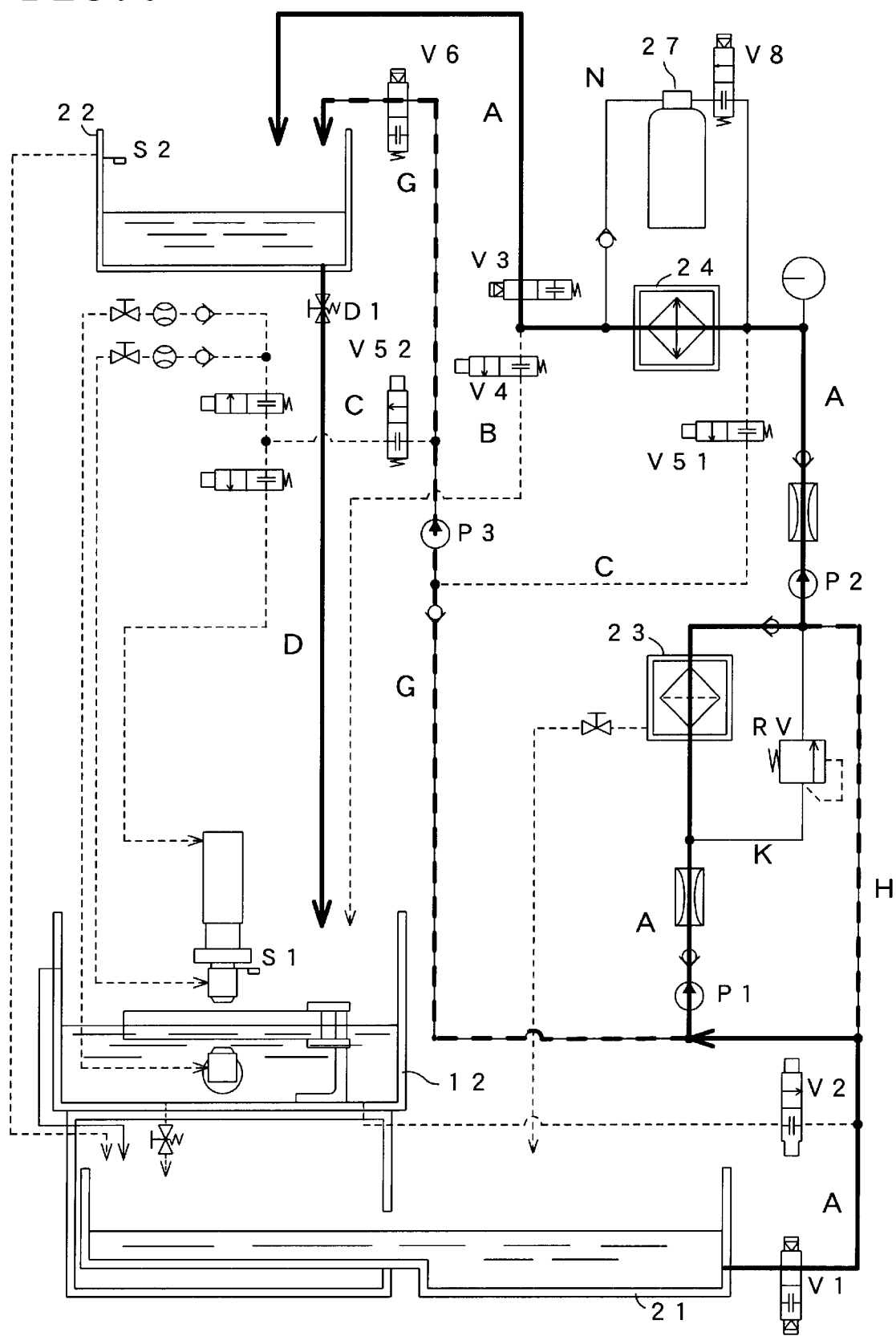
FIG. 6 is a piping layout drawing showing the state when the dielectric fluid system is feeding dielectric fluid from an auxiliary tank to the work tank, and pumping dielectric fluid from the dielectric fluid reservoir to the auxiliary tank.

Next, as shown in FIG. 6, upon output of a rapid feed command signal the drain valve D1 is immediately opened and dielectric fluid drops in one "slug" from the rapid feed pipe line D utilizing the difference of elevation between the auxiliary tank 22 and the work tank 12. At this time, the first and second pumps P1 and P2 of the main supply pipe line are normally continuously driven, and dielectric fluid pumped continuously in the auxiliary tank 22 drops down directly to the work tank. With this embodiment, since the volume of the auxiliary tank 22 is preferably about half the volume of the work tank 21, the amount of fluid pumped in advance to the auxiliary tank 22 is generally less than the amount of dielectric fluid that is to be rapid fed to the work tank 12, which means that pumping for this insufficient amount is carried out continuously. Pumping time of the dielectric fluid is then sufficiently longer than the time for dielectric fluid to fall, which means that the time to continuously pump dielectric fluid to the auxiliary tank 22 becomes the rapid feed time. Specifically, the rapid feed time is not the time taken to supply all of a desired amount of dielectric fluid to the work tank 12, but is the time taken to pump an insufficient amount of dielectric fluid, obtained by subtracting the amount of dielectric fluid held in advance in the auxiliary tank 22 from this total amount of dielectric fluid, to the auxiliary tank 22.

With this type of rapid feed operation also, in a manner similar to that performed the time of the rapid feed preparation operation, dielectric fluid is circulated in the regulating pipe line H according to any difference in discharge capability between the pump P1 and the pump P2. Also, the relief pipe line K may be provided in a closed state in readiness for any abnormality. Pumping to the auxiliary tank 22, which utilizes the by-pass pipe line G and the third pump P3, is preferably supplemented. The specific resistance management pipe line N may also be opened as required.

We will now specifically described how the rapid feed time may be made shorter. As previously mentioned, the volume of the auxiliary tank 22 is preferably about half the maximum volume of the work tank 12. Assuming that it is exactly half, a desired rapid feed time, a volume of dielectric fluid to be supplied to the work tank 12, and the discharge capability of the two pumps P1 and P2 may be selected, for example, as follows. To rapidly feed dielectric fluid equal to about 400 liters, which is the maximum volume of a typical work tank 12, in about 5 minutes, the volume of the auxiliary tank 22 is selected to be about half the volume of the work tank 12, namely about 200 liters, and the discharge capability of the pumps P1 and P2 is selected as about 40 liters per minute. In this example, the volume of the filter tank 23b is preferably about 50 liters.

In this example, the time required for rapid feeding of the maximum volume of about 400 liters of dielectric fluid is slightly more than 5 minutes, which is the time to pump the deficient 200 liters of dielectric fluid to the auxiliary tank 22. Also, in the event that the dielectric fluid to be rapidly fed is 300 liters, the amount of dielectric fluid that is deficient is only 100 liters, and so the final rapid feed time in this case will be slightly longer than two and a half minutes. As an extreme case, if the amount of dielectric fluid to be rapidly fed is 200 liters, there is no deficit of dielectric fluid, and so the rapid feed time is only the time taken for the dielectric fluid to fall down from the above described drain, which in this embodiment is about 20 seconds. On the contrary, in the event that the auxiliary tank 22 is not used and the full amount of 400 liters of dielectric fluid is to be rapidly fed to the work tank 12 from an empty state, the rapid feed time may be as long as about 10 minutes.

In the above-described embodiment, the rapid feed time is reduced to less than half as compared to the related art. Moreover, in the case where the dielectric fluid that is required to be rapidly fed is equal to the volume of the auxiliary tank 22, there is virtually no rapid feed time required. Moreover, pumping to the auxiliary tank 22 is carried out during set up, as a rapid feed preparation operation, which means that the only waiting time the operator experiences regarding dielectric fluid supply to the work tank, is the 1reduced rapid feed time.

In the event that the by-pass pipe line G is provided, in addition to the rapid feed operation described above, it is possible to perform pumping using the pump P3 of the pipe line G. In this specific embodiment, in the case where the feed capability of the pump P3 is 40 liters per minute, the pumping capability to the auxiliary tank 22 is doubled, and so the rapid feed time for supply of the 400 liters of dielectric fluid, being the maximum volume described above, is reduced to about two and a half minutes. Also, in the event that the dielectric fluid to be supplied to the work tank is 300 liters, the feed time is reduced drastically to about one minute 15 seconds. In this way, by addition of the by-pass pipe line G and the pump P3 the rapid feed time is further reduced to less than a quarter of the related art.

Ultimately, by detecting the liquid level in the work tank 12 using the liquid level sensor S1 of the work tank 12, or by using the control device to measure fluid feed amount based on time to convey the fluid so as to estimate a high fluid level, the control device detects the dielectric fluid in the work tank 12 attaining a desired fluid amount, stops the first pump P1, the second pump P2 and the third pump P3, and closes the respective control valves, thus completing the dielectric fluid rapid feed process.

Figure 7:
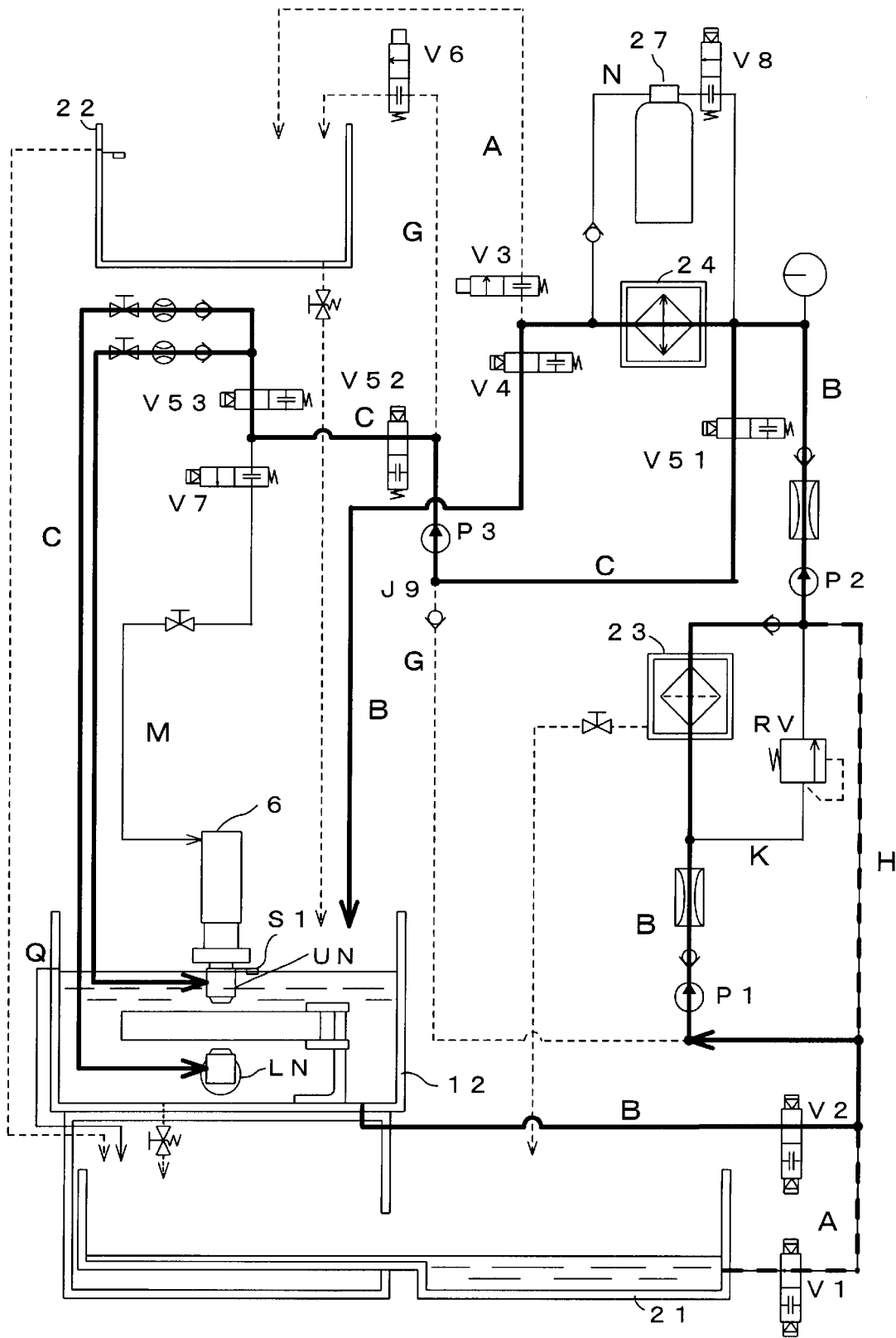
FIG. 7 is a piping layout drawing showing the state when the dielectric fluid system circulates dielectric fluid during machining, and for flushing.

Next, when an electric discharge machining start command is output by the control device, then, as shown in FIG. 7 the control valves V2 and V4 are opened to form the circulating pipe line B, while at the same time the control valves V51, V52 and V53 are opened to form the flushing pipe line C. The first pump P1 and the second pump P2 then feed dirty dielectric fluid from the work tank 12 to the filter device 23 and the cooler 24, and the dielectric fluid is filtered to produce clean dielectric fluid, cooled to a specified temperature. Then the clean and cooled dielectric is directly circulated from the circulating path B to the work tank 12. When the dielectric fluid surface in the work tank becomes lower during machining, as is indicated by a detection signal from the liquid level sensor S1 attached close to the upper nozzle UN, the control valve V1 is opened and an appropriate amount of dielectric fluid is replenished from the dielectric fluid reservoir 21 using the circulating pipe line B, i.e., until the liquid level sensor SI generates a detection signal that the liquid level as appropriate. Also, in the event that the flushing pipe line C is provided, dielectric fluid is pumped from the work tank 12, using the circulating pipe line B, then filtered, pressurized by the third pump P3, and jetted to the machining gap from the nozzles UN and LN of the flushing pipe line C. When automatic wire threading is carried out, the control valve V7 may be opened to supply dielectric fluid to the automatic wire threader 6. As concerns flushing, in the case where the by-pass pipe line G is provided at the inlet side of the third pump P3, hardly any dirty dielectric fluid is sucked from the by-pass pipe line G side, at the confluence point J9 of the flushing pipe line C and the by-pass pipe line G. This is because dielectric fluid inside the flushing pipe line C upstream from the confluence point J9 is supplied with discharge pressure from the pump P2.

Thus, the amount of dielectric fluid filtered and supplied for circulation and flushing from the circulating pipe line B and the flushing pipe line C is suppressed to the minimum fluid amount, and filtration and cooling of circulated and flushed dielectric fluid is carried out effectively. Obviously, surplus dielectric fluid also circulates in the regulating pipe line H during the above-described circulation and flushing operations, similarly to during the rapid feed preparation and rapid feed operations. Also, the relief pipe line K may be held in a closed (stand-by) state in readiness for any abnormality. The specific resistance management pipe line N may also be opened as required.

Upon completion of electric discharge machining, in FIG. 7, the control valves V2, V4, V52, V51 and V53 are closed, and the first pump P1, the second pump P2 and the third pump P3 are all stopped.

Figure 8:
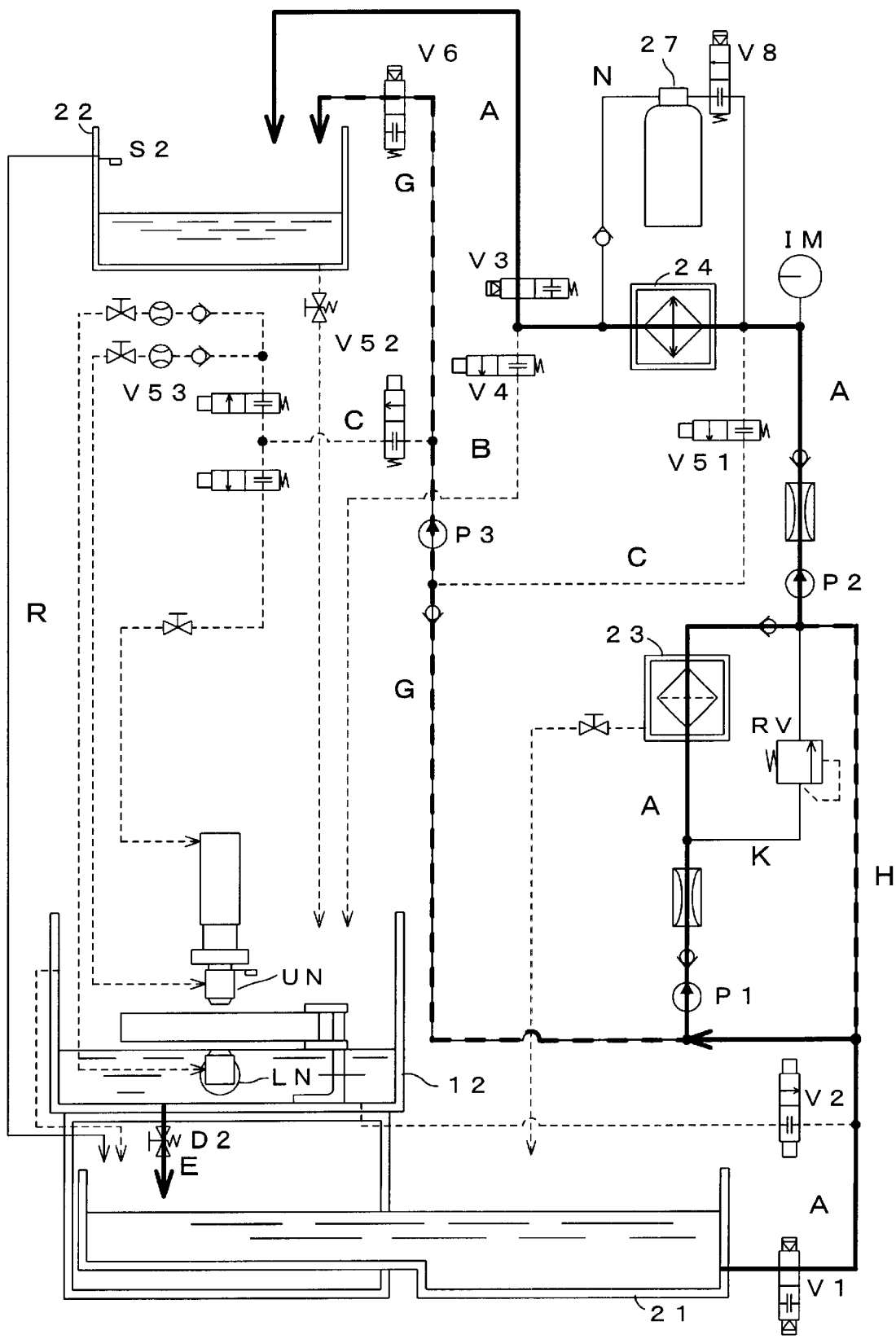
FIG. 8 is a piping layout drawing showing the state when the dielectric fluid system is discharging dielectric fluid from the work tank, and pumping dielectric fluid from the dielectric fluid reservoir to the auxiliary tank.

Next, when electric discharge machining has been completed and dirty dielectric fluid is discharged from the work tank 12, as shown in FIG. 8, a drainage command is output from the control device to open the drain valve D2 and dielectric fluid in the work tank 12 flows out from the drainage pipe line E to the dielectric fluid reservoir 21. Then, depending on whether or not subsequent electric discharge machining is to be resumed during or after the discharge operation, a command indicating whether or not to resume pumping to the auxiliary tank 22 is input. When electric discharge machining is not to be resumed immediately, dielectric fluid is not pumped to the auxiliary tank 22 and is only stored in the dielectric fluid reservoir 21, and the system is then in the state shown in FIG. 4. On the other hand, when machining is to be resumed urgently, then, after the discharge command or in addition to the discharge command, a rapid feed preparation command is output from the control device. In this case, continuing on from a process for completely discharging dielectric fluid from the work tank 12, or concurrently with this process, the control valves V1 and V3 are opened, and the first and second pumps P1 and P2 are operated to filter and cool the dielectric fluid stored in the dielectric fluid reservoir 21 and pump this filtered and cooled dielectric fluid to the auxiliary tank 22. This state is the same as the above-described state in FIG. 5. Also, in FIG. 8, the rapid feed preparation state is shown in addition to the discharge state. Use of the pipe lines H, K, N and G as required is also the same. After that, the system stands-by with the dielectric remaining stored in a specified amount in the auxiliary tank 22, and supply to the work tank 12 starts upon the next rapid feed command, as described above.

In this way, a process for pumping cleaned dielectric fluid to the auxiliary tank 22 can be commenced during the discharge operation or immediately after the discharge operation, and upon completion of operations such as planning and preparation for carrying out the next machining etc., the system is placed in a state where cleaned dielectric fluid has been pumped to the auxiliary tank 22.

An important point of the invention disclosed in this embodiment is that by replacing the clean dielectric fluid tank of the related art with the compact filter device and the auxiliary tank, and by arranging the auxiliary tank above the dielectric fluid reservoir having only the dirty dielectric fluid tank, the installation space occupied by the dielectric fluid system is significantly reduced. Also, by arranging two pumps upstream and downstream of the filter device, and providing the relief pipe line K and the regulating pipe line H, highly efficient rapid feed and filtration may be enabled, even when using a small filter device, and the danger of serious damage occurring if there is clogging of the filter or one of the pumps fails is all but eliminated. Also, during rapid feed, by continuously pumping dielectric fluid to the auxiliary tank in addition to allowing the dielectric fluid pumped in advance fall down from the auxiliary tank, the time for rapid feed to the work tank may be significantly reduced, even if the auxiliary tank is not as large as the work tank. Also, since the circulation of the dielectric fluid is carried out using direct circulation from the work tank to the work tank via the filter device, circulation can be performed very efficiently with the minimum space. Further, in the case of auxiliary pumping of dielectric fluid to the auxiliary tank via the by-pass pipe line using the pump of the flushing pipe line, the time for this pumping may be dramatically reduced, as a result of which the rapid feed time is shortened.

The above-described embodiments illustrate the presently preferred embodiments, and various modifications are possible within the scope of the present invention without deviating from the spirit of the invention. Specifically, adding pipe lines or members having separate functions, changing the combination of pipe lines or the setting positions of members, or the sharing of a number of pipe lines, is included within the technical scope of the present invention. Although in this embodiment a wire cut electric discharge machining apparatus using a water based dielectric fluid has been described as an illustrative example, the structure is basically the same with a die sinking electric discharge machining apparatus and/or an electric discharge machining apparatus which uses an oil based dielectric fluid.

What is claimed is:

1. A dielectric fluid system for an electric discharge machining apparatus for supplying electric discharge machining fluid to a work tank, comprising:

a dielectric fluid reservoir for storing electric discharge machining fluid collected from the work tank;

an auxiliary tank, the bottom of which is positioned at least as high as a fluid level in the work tank and above the dielectric fluid reservoir;

a filter arranged between the dielectric fluid reservoir and the auxiliary tank;

a main supply pipe line connecting the dielectric fluid reservoir to the auxiliary tank, and including in series a first pump having an intake side and an outlet side, the filter, and a second pump having an intake side and an outlet side;

a circulating pipe line connecting the work tank to the main supply pipe line upstream of the intake side of the first pump and branching from the main supply pipe line at the outlet side of the second pump, and connecting to the work tank;

a rapid feed pipe line connecting to the auxiliary tank and the work tank and having a first drain valve;

a drain pipe line, connecting the work tank to the dielectric fluid reservoir and having a second drain valve;

first and second control valves, positioned at the intake side of the first pump, for selectively opening and closing the main supply pipe line and the circulating pipe line; and third and fourth control valves, positioned at the outlet side of the first pump, for selectively opening and closing the main supply pipe line and the circulating pipe line.

2. The dielectric fluid system for an electric discharge machining apparatus according to claim 1, further comprising:

a relief pipe line, including a relief valve, connecting an upstream side and a downstream side of the filter; and a regulating pipe line, branching upstream of the intake side of first pump, and merging between the filter and the intake side of the second pump, said regulating pipe line being connected in parallel with the first pump and the filter.

3. A dielectric fluid system for an electric discharge machining apparatus for supplying electric discharge machining fluid to a work tank, comprising:

- a dielectric fluid reservoir for storing electric discharge machining fluid collected from the work tank;
- an auxiliary tank positioned at least as high as a fluid level in the work tank and above the dielectric fluid reservoir;
- a filter arranged between the dielectric fluid reservoir and the auxiliary tank;
- a main supply pipe line connecting the dielectric fluid reservoir to the auxiliary tank, and including in series a first pump having an intake side and an outlet side, the filter, and a second pump having an intake side and an outlet side;
- a circulating pipe line connecting the work tank to the main supply pipe line at a position upstream of the intake side of the first pump and branching from the main supply pipe line downstream of the outlet side of the second pump, and connecting to the work tank;
- a flushing pipe line branching from the circulating pipe line at the outlet side of the second pump and connecting to a flushing device of the electric discharge machining apparatus, said flushing pipe line having a third pump having an intake side and an outlet side;
- a rapid feed pipe line connecting the auxiliary tank and the work tank and having a first drain valve;
- a drain pipe line, having a first drain valve, and connecting the work tank to the dielectric fluid reservoir;
- first and second control valves, positioned at the intake side of the first pump, for selectively opening and closing the main supply pipe line and the circulating pipe line;
- third and fourth control valves, positioned at an outlet side of the first pump, for selectively opening and closing the main supply pipe line and the circulating pipe line; and
- a fifth control valve group in the flushing pipe line for selectively opening and closing the flushing pipe line.

4. The dielectric fluid system for an electric discharge machining apparatus according to claim 3, further comprising:

- a by-pass pipe line, branching from the main supply pipe line at the intake side of the first pump, and combining with the flushing pipe line including the third pump at the intake side of the third pump, and branching from the flushing pipe line at the outlet side of the third pump and connecting to the auxiliary tank, and
- a sixth control valve for selectively opening and closing the by-pass pipe line.

5. The dielectric fluid system for an electric discharge machining apparatus according to claim 4, further comprising:

- a relief pipe line, including a relief valve, connecting an upstream side and a downstream side of the filter; and
- a regulating pipe line, branching upstream of the intake side of the first pump, and merging between the filter and the intake side of the second pump, said regulating pipe line being connected in parallel with the first pump and the filter.

6. The dielectric fluid system for an electric discharge machining apparatus according to claim 3, further comprising:

- a relief pipe line, including a relief valve, connecting an upstream side and a downstream side of the filter; and
- a regulating pipe line, branching upstream of the intake side of the first pump, and merging between the filter and the intake side of the second pump, said regulating pipe line being connected in parallel with the first pump and the filter.

* * * * *